No. 609,140. Patented Aug. 16, 1898.
R. W. C. CLEVELAND.
MACHINE FOR GRINDING BACKS OF BUTTON BLANKS.
(No Model.)
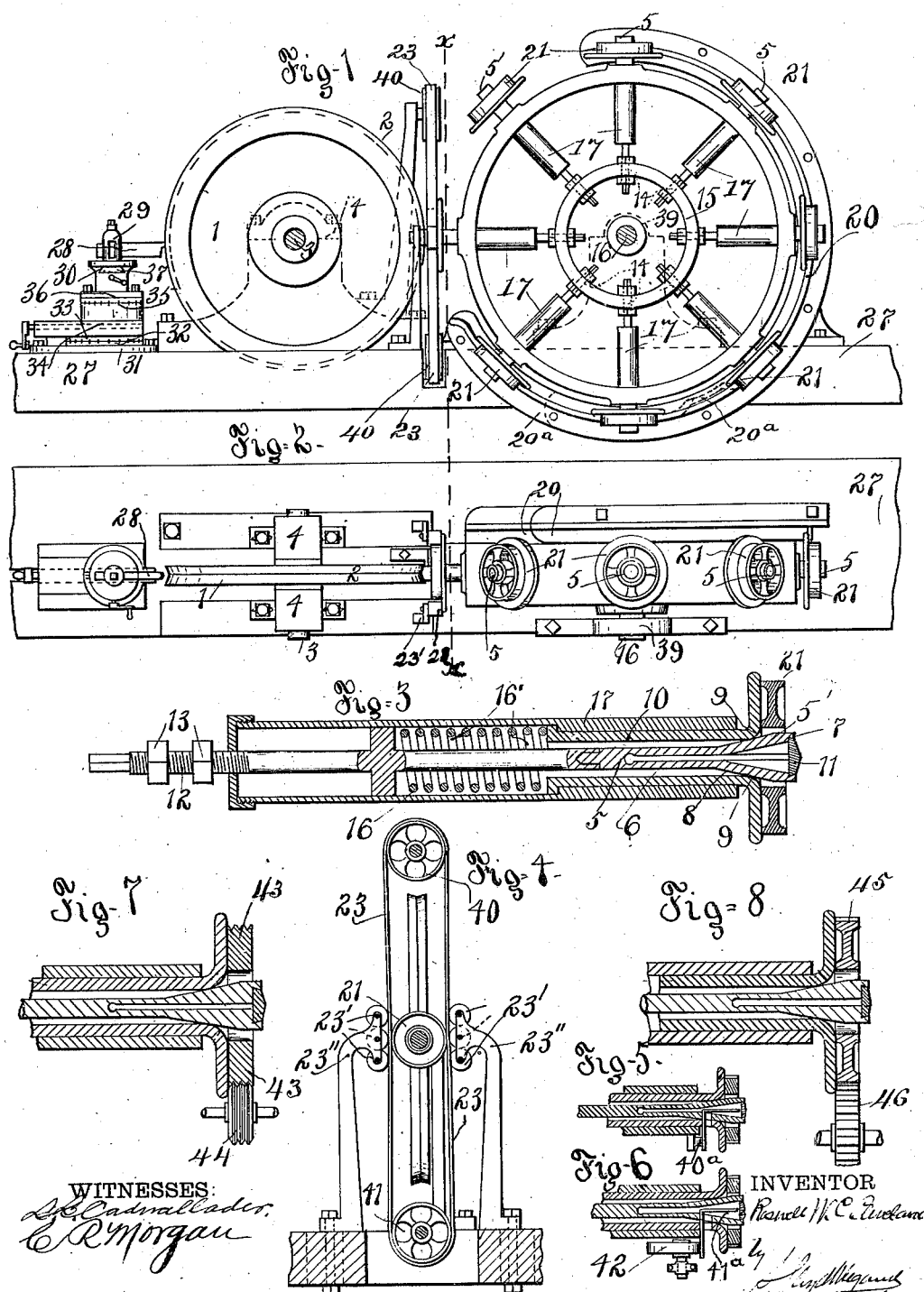
WITNESSES:
INVENTOR

UNITED STATES PATENT OFFICE.

ROSWELL W. C. CLEVELAND, OF PHILADELPHIA, PENNSYLVANIA, ASSIGNOR OF ONE-HALF TO STEWART P. WHARTON, OF SAME PLACE.

MACHINE FOR GRINDING BACKS OF BUTTON-BLANKS.

SPECIFICATION forming part of Letters Patent No. 609,140, dated August 16, 1898.

Application filed November 14, 1896. Serial No. 612,053. (No model.)

*To all whom it may concern:*

Be it known that I, ROSWELL W. C. CLEVELAND, a citizen of the United States, residing at Philadelphia, in the county of Philadelphia and State of Pennsylvania, have invented certain new and useful Improvements in Machines for Grinding the Backs of Button-Blanks; and I do hereby declare the following to be a sufficiently full, clear, and exact description thereof as to enable others skilled in the art to make and use the said invention.

This invention relates to the manufacture of pearl buttons, and especially to the grinding of the backs of blanks for such buttons, and has for its object the accurate and expeditious performance of such work by automatic mechanism, and thereby saving expense and waste of material incident to such work as usually performed by manual skill.

The nature of this invention to accomplish these ends consists in a series of automatically-actuated gripping-chucks arranged to rotate in series before a grinding-wheel, to which they apply the blanks. Each chuck turns on its own axis and turns the blank during the grinding operation and after being ground discharges it and receives another blank to be similarly treated.

The following is a fully detailed description of the machine and the operation thereof, reference being had to the accompanying drawings, in which—

Figure 1 shows a side elevation of the machine with part of the frame removed; Fig. 2, a plan view thereof; Fig. 3, an enlarged partly-sectional view of one of the gripping-chucks; Fig. 4, a section of the machine in the plane indicated by the dotted line *x x* in Figs. 1 and 2, and Figs. 5 and 6 show in section portions of the chucks with modified devices adapting them to discharge the blanks when turning in horizontal instead of a vertical plane. Figs. 7 and 8 are sectional views of modified forms of driving mechanism.

Referring to the drawings, 1 represents a grinding-wheel having a face 2 of a profile the counterpart of the intended profiles of the button-backs and rotated and supported on an arbor 3, resting on bearings 4 4.

5 5 5 5, &c., are spring-chucks the jaws 5' of which have internal shoulders 7, adapted to hold a button-blank 11 by the edges, with the face of the button resting upon the shoulders 7 and the jaws 5'.

The jaws open by the elasticity of the spring portions 6. The backs of the jaws 5' have tapering angular shoulders 8, which fit in corresponding tapering angular sockets 9 in hollow arbors 10. Back of the shoulders 8 of the chuck-jaws 5' are the spring portions 6, which unite the jaws 5' with a screw 12, provided with jam-nuts 13 13, by which the chuck is adjusted radially and the inner end held in a bearing 14, so as to rotate freely therein.

The bearings 14 are formed equidistantly in a wheel 15, which turns slowly with an arbor 16, supported in bearings 39 on the frame 27. In the wheel 15 are bearings 17, in which are supported and turn the arbors 10.

The arbors 10 and the chucks 5, fitted therein, are arranged at equal distances and in radial position in the wheel 15. In addition to the rotary motion of the arbor 10 in the bearing 17 they are also susceptible of sliding therein radially and are each pressed outwardly from the center by a spring 16, so that the oblique shoulders 8 of the jaws 5' are forced toward each other by the tapering socket 9 of the arbors 10 and close upon the edges of the button-blanks 11, holding them securely in central position with the axes of the arbor 10.

A stationary cam 20 is located so that the outer ends of the arbors 10 press against it and move the arbors 10 inwardly after they have passed the driving-wheel 1, and thus open the jaws 5' and liberate the blanks that have been ground, so that they then drop out of the chucks when they approach an inverted position. The cam 20 holds the arbors 10 in this position until the arbors again assume a vertical position, and as they approach this position the chucks are again supplied with blanks, rendering the operation of the machine continuous. The cam 20 may be made, as indicated in dotted line, to commence near the bottom of the wheel 15, so that the jarring of opening the jaws will occur when the chucks are inverted, and thus facilitate the liberation of the button-blanks from the chucks. A waved or serpentined shape of the cam 20 near this point, as indicated in dotted lines, may be made to further insure such disengaging by jarring and jolting.

Pulleys 21, fixed on the arbors 10, receive rotary motion by contacting with a moving endless band 23, driven by wheels 40 and 41, and transmit such motion to the arbors 10 and chuck-jaws 5' and the blank 11, held therein, so as to grind them on the side presented to the wheel 1 of the circular shape conforming to the profile of the face 2 of the wheel 1. The bands 23 are pressed toward the pulleys 21 by wheels 23', adjustably held by frames 23", so that they make a propelling contact only at the point where the blanks engage the grinding-wheel, and in other parts of their travel the chucks and blank do not rotate. Other mechanisms, such as a toothed or chain gear or friction-wheels, may be substituted with like effect.

The effect of the continued motion of the button-blank rotating upon its axis and turning with a steady progressive motion upon the axis of the wheel 15 in contact with the face 2 of the grinding-wheel 1 is to produce a profile on the surface thus ground exactly alike in every diametral direction.

The grinding-wheel 1 is rotated by an arbor 3, turning in bearings 4, fixed on the frame adjustably toward the wheel 15, so as to compensate for the diametral reduction (from wear) of the wheel 1.

The proper form of profile in the face 2 of the grinding-wheel 1 is maintained by turning it with a tool 28, guided and operated by a holder 29 and rest 30, adjustably fastened to the frame 27. The rest 30 consists of a base 31, adjustably secured to the frame 27, a swiveled or angularly-adjustable slide 32, secured thereto, having a right-lined guide 33 and slide 34, worked by a screw or like propelling device, a second swivel 35 on the slide 34, bearing another guide 36, upon which is fitted a slide 37, bearing the tool-holder 29 and tool 28. The tools are preferably with diamond cutting-points; but other forms, such as pointed toothed wheels, may be used for some forms of profiles.

This machine may be constructed so that the axes of the wheels 1 and 15 are in vertical position and the arbors of the chucks in horizontal position, in which case a spring $40^a$ is employed, as shown in Fig. 5, to expel the blank when the chuck opens, or a plunger $41^a$, actuated by a cam 42, may be used, as shown in Fig. 6. In lieu of the pulleys 40 and 41 and the band 23 friction-wheels 43 and 44 may be employed, as shown in Fig. 7, or, as shown in Fig. 8, gear 45 and pinion 46 may be used.

By steadily supplying the rough blanks to the chucks 5 they are carried to and through the grinding action of the wheel 1 and discharged. Opportunity for sorting and rejecting defective or insufficiently-sized blanks is afforded to the attendant while the machine is steadily grinding.

Having described my invention, what I claim is—

1. In a machine for grinding the backs of buttons, a grinding-wheel, means of rotating the same, a series of contractible and expansible chuck-jaws, a wheel supporting the same arranged to rotate with said chucks about a common axis, screws and nuts arranged to independently adjust said chuck-jaws in radial direction to and from said axis, said supporting-wheel having bearings therein holding said chucks rotatably each upon its own axis, and susceptible of sliding radially therein, and means to close said chucks and press them toward the grinding-wheel, in combination with a stationary cam arranged to open said chucks, all arranged to operate substantially as set forth.

2. In a button-grinding machine, the combination with a series of spring-chucks, the wheel supporting the chucks, a grinding-wheel, and means for operating the grinding-wheel, of a pulley attached to each chuck, an endless traveling band, and the adjustable wheels bearing upon said band to make a propelling contact only at the point where the button-blanks engage the grinding-wheel, substantially as set forth.

ROSWELL W. C. CLEVELAND.

Witnesses:
HOLSTEIN DE HAVEN,
LACEY L. CADWALLADER.